(12) United States Patent
Wang

(10) Patent No.: US 11,355,871 B2
(45) Date of Patent: Jun. 7, 2022

(54) JOINT OF COPPER TERMINAL AND ALUMINIUM CONDUCTOR AND ULTRASONIC WELDING METHOD HEREOF

(71) Applicant: JILIN ZHONG YING HIGH TECHNOLOGY CO., LTD., Jilin (CN)

(72) Inventor: Chao Wang, Jilin (CN)

(73) Assignee: JILIN ZHONG YING HIGH TECHNOLOGY CO., LTD., Jilin (CN)

( * ) Notice: Subject to any disclaimer, the term of this patent is extended or adjusted under 35 U.S.C. 154(b) by 0 days.

(21) Appl. No.: 16/619,938

(22) PCT Filed: Jun. 5, 2018

(86) PCT No.: PCT/CN2018/089927
§ 371 (c)(1),
(2) Date: Dec. 5, 2019

(87) PCT Pub. No.: WO2018/223954
PCT Pub. Date: Dec. 13, 2018

(65) Prior Publication Data
US 2020/0395690 A1 Dec. 17, 2020

(30) Foreign Application Priority Data
Jun. 5, 2017 (CN) .......................... 201710415044.4

(51) Int. Cl.
*H01R 4/62* (2006.01)
*H01R 11/12* (2006.01)
*H01R 43/02* (2006.01)

(52) U.S. Cl.
CPC ............. *H01R 4/625* (2013.01); *H01R 11/12* (2013.01); *H01R 43/0207* (2013.01)

(58) Field of Classification Search
CPC ..... H01R 4/625; H01R 11/12; H01R 43/0207
See application file for complete search history.

(56) References Cited

U.S. PATENT DOCUMENTS 5,966,806 A  10/1999 Maeda
6,588,646 B2 * 7/2003 Loprire .................. B23K 20/10
228/110.1

(Continued)

FOREIGN PATENT DOCUMENTS

CN  102089940 A  6/2011
CN  105308804 A  2/2016

(Continued)

OTHER PUBLICATIONS

International Search Report for PCT/CN2018/089927 dated Sep. 5, 2018, ISA/CN.

(Continued)

*Primary Examiner* — Oscar C Jimenez
(74) *Attorney, Agent, or Firm* — Yue (Robert) Xu; Apex Attorneys at Law, LLP

(57) ABSTRACT

Disclosed are a joint of a copper terminal and an aluminium conductor and an ultrasonic welding method thereof. One spacing metal layer is added between the copper terminal and the aluminium conductor, and firstly, the spacing metal layer is fixed at a welding end of a base material by means of a manner such as electroplating, pressure welding, electric arc spray welding or electromagnetic welding, and the three parts are then welded together by means of an ultrasonic welding manner. The welding method is suitable for the welding of various joints, the electrochemical corrosion resulting from the potential difference between the copper and aluminium electrodes can be effectively reduced, and the mechanical properties of the joint can be improved.

16 Claims, 2 Drawing Sheets

A   B   C   D

(56) References Cited

U.S. PATENT DOCUMENTS

| | | | |
|---|---|---|---|
| 7,705,265 B2* | 4/2010 | Asakura | H01R 43/0221 |
| | | | 219/121.64 |
| 8,826,533 B2* | 9/2014 | Seifert | H01R 4/187 |
| | | | 29/857 |
| 10,128,628 B2* | 11/2018 | Ootsuka | H01R 4/185 |
| 10,483,657 B2* | 11/2019 | Nabeta | H01R 43/0488 |
| 10,727,615 B2* | 7/2020 | Gregor | C23C 4/18 |
| 2004/0088857 A1* | 5/2004 | Fujimoto | H01R 43/0207 |
| | | | 29/871 |
| 2006/0292922 A1* | 12/2006 | Froschl | H01R 4/625 |
| | | | 439/442 |
| 2011/0094797 A1 | 4/2011 | Otsuka et al. | |
| 2011/0198122 A1* | 8/2011 | Sagawa | H01R 4/029 |
| | | | 174/84 R |
| 2011/0220385 A1 | 9/2011 | Lietz et al. | |
| 2012/0324727 A1* | 12/2012 | Seifert | H01R 43/048 |
| | | | 29/867 |
| 2014/0182127 A1* | 7/2014 | Kovacs | H01R 9/032 |
| | | | 29/860 |
| 2014/0317922 A1 | 10/2014 | Schmidt et al. | |
| 2016/0336662 A1 | 11/2016 | Ooba | |

FOREIGN PATENT DOCUMENTS

| | | |
|---|---|---|
| CN | 107342466 A | 11/2017 |
| CN | 207069080 U | 3/2018 |
| DE | 102008058047 A1 | 5/2010 |
| JP | H0982447 A | 3/1997 |
| JP | 2007012329 A | 1/2007 |
| JP | 2011165618 A | 8/2011 |
| JP | 2015176860 A | 10/2015 |
| JP | 2015220144 A | 12/2015 |
| WO | 2016198399 A1 | 12/2016 |

OTHER PUBLICATIONS

Search Report dated Jan. 18, 2021 for European patent application No. 18813938.0.

First Office Action dated Apr. 19, 2022 for Japanese patent application No. 2020-517254, English translation provided by Global Dossier.

* cited by examiner

JOINT OF COPPER TERMINAL AND ALUMINIUM CONDUCTOR AND ULTRASONIC WELDING METHOD HEREOF

The present application is the national phase of International Patent Application No. PCT/CN2018/089927, titled "JOINT OF COPPER TERMINAL AND ALUMINIUM CONDUCTOR AND ULTRASONIC WELDING METHOD THEREOF", filed on Jun. 5, 2018, which claims priority to Chinese Patent Application No. 201710415044.4, titled "JOINT OF COPPER TERMINAL AND ALUMINIUM CONDUCTOR AND ULTRASONIC WELDING METHOD THEREOF", filed on Jun. 5, 2017 with the Chinese Patent Office, both of which are incorporated herein by reference in their entireties.

FIELD

The present application relates to the field of wire harness, and in particular to a joint of a copper terminal and an aluminum wire for a wire harness and an ultrasonic welding method thereof.

BACKGROUND

Copper is widely used due to its good electrical conductivity, thermal conductivity and plasticity. However, since there is a shortage of copper resources and the cost for copper is high, people have to find other materials as alternatives of copper to reduce the cost. The main trend is to replace copper with aluminum due to a low cost, as well as good electrical conductivity, thermal conductivity and plastic workability of aluminum. However, aluminum is not as good as copper in some performances, and some components cannot be made of aluminum instead of copper, so in some cases, it has to form a welded joint between an aluminum component and a copper component. For example, in order to connect a cable formed by aluminum wires to a copper component in an electrical device or to a copper cable, it is required to perform welding at a contact position between aluminum and copper to realize the connection.

There are two following technical problems that have not been solved in connection and conduction between aluminum and copper. First, aluminum is an active metal, and a dense oxide film having a thickness of about 50 angstroms (1 angstrom=0.1 nm) is formed immediately on a surface of aluminum once aluminum is placed in dry air, to prevent aluminum from being further oxidized, which may greatly decrease the electrical conductivity of the aluminum wire. Second, copper and aluminum are different elements, copper has a metal inertia greater than that of aluminum, and a difference between electrode potentials of copper and aluminum is 1.9997V, thus an electrochemical reaction may occur in a case that the two metals are connected and powered on, thereby gradually oxidizing the aluminum wire, thus reducing the mechanical strength and the electrical conductivity of the aluminum wire.

In the conventional technology, a joint of a terminal of a wire harness and a wire may be formed with any one of a pressure welding method, a conventional ultrasonic welding method, an ultrasonic brazing method and the like.

In the conventional technology for wire harness connection, a terminal is joined with a wire mainly with a pressure welding method, that is, a conductive core of the wire is arranged on a connecting part of the terminal, and the terminal is pressed to be joined with the wire mechanically by a terminal pressing mold. However, the electrochemical reaction occurring between the joined aluminum wire and copper terminal over time cannot be eliminated with the conventional pressure welding method, resulting in a decrease in mechanical and electrical performances of the joint of the copper terminal and the aluminum wire. Therefore, it is difficult to apply the pressure welding method in an industrial production of the joint of the copper terminal and the aluminum wire.

In the conventional ultrasonic welding method, since an oxide film or coating on a surface of a to-be-welded metal has little effect on the welding quality and no heat source is used to generate any as-cast nugget or brittle intermetallic compound, the conventional ultrasonic welding method is a preferred welding method for forming the joint of the copper terminal and the aluminum wire. However, if copper and aluminum are directly joined together with the ultrasonic welding method, since the difference between electrode potentials of the two metals is large, electrochemical corrosion may occur between the copper terminal and the aluminum wire over time, resulting in an increased resistance, an increased voltage drop, and a decreased mechanical performance, thus reducing the service life of the joint. In view of the above, the Chinese invention patent CN102216021B discloses an ultrasonic welding method in which a sealant is applied between the copper terminal and the aluminum wire for isolation, which may reduce the electrochemical corrosion between copper and aluminum. However, due to the sealant, the welding is performed insufficiently between copper and aluminum, resulting in a decreased mechanical performance of the joint. Further, since the sealant has a poor conductivity, which may affect the electrical conductivity of the joint, thus the mechanical and electrical performances of the joint of the copper terminal and the aluminum wire cannot meet the requirements for usage and stability. In addition, according to the patent, the copper terminal is a flat terminal. However, most of wire harnesses includes non-flat terminals, for which joints are required to be formed, thus the patent CN102216021B has an application limitation.

In the ultrasonic brazing method, an oxide film on a surface of a to-be-welded substrate is broken by ultrasonic vibration, and then two substrates are joined together in a brazing method. However, the ultrasonic brazing method cannot be applied in the industrial production of the joint between the copper terminal and the aluminum wire due to the following significant problems in the ultrasonic brazing method. Specifically, it is difficult to fully fill a weld seam with a solder for ultrasonic brazing, thus an unfilled irregular gap may be formed between the copper terminal and the aluminum wire. However, such unfilled irregular gap is detected only by a complete destructive test, which fails to ensure that each joint stably meets the requirements for electrical and mechanical performances. Therefore, the ultrasonic brazing method for forming a joint of a copper terminal and an aluminum wire cannot be applied to a mass industrial production.

In summary, it is impossible to find any welding method in the conventional technology, which is applicable to various wire harnesses with copper terminals of different shapes, to form a joint of a copper terminal and an aluminum wire that meets the requirements for mechanical and electrical performances. Therefore, it is urgently to provide a low-cost joint of a copper terminal and an aluminum wire and a method for forming the same, which meet a usage requirement of a wire harness.

SUMMARY

An objective of the present application is to provide a joint of a copper terminal and an aluminum wire and ultrasonic welding method thereof.

Another objective of the present application is to provide a joint for reducing a difference between electrode potentials of a copper terminal and an aluminum wire and an ultrasonic welding method thereof, which are facilitate to reduce or avoid electrochemical corrosion of the joint of the copper terminal and the aluminum wire, thereby significantly improving the service life of the joint.

Another objective of the present application is to provide a structure for effectively improving a mechanical performance of a joint of a copper terminal and an aluminum wire and a welding method thereof, with which a pull-out force of the joint of the copper terminal and the aluminum wire can be increased by at least 20% after a salt spray test compared with that of the conventional technology.

Another objective of the present application is to provide a joint of a copper terminal and an aluminum wire and a welding method thereof, with which a cost can be significantly reduced.

The above objectives of the present application may be achieved by the following technical solutions.

A joint of a copper terminal and an aluminum wire is provided according to the present application. The copper terminal includes a connecting part and a functional part connected with the connecting part. A conductive core of the aluminum wire is connected with the connecting part of the copper terminal. Specifically, the conductive core of the aluminum wire is connected with the connecting part of the copper terminal via a metal spacer layer.

In the present application, the copper terminal may be a flat terminal, an open terminal, a barrel-shaped terminal, or an end of a solid-core copper wire. The copper terminal includes a connecting part and a functional part connected with the connecting part. The connecting part is used for connecting the copper terminal with the aluminum wire. The flat copper terminal includes a flat connecting part, the open terminal includes a wing shaped connecting part, and the barrel-shaped terminal includes a barrel-shaped connecting part. The functional part is used for connecting the copper terminal with a power consumption device, which is fixed at an end of the cable and used as a main zone for electrically connecting the copper terminal with the power consumption device. There is no difference between the connecting part and the functional part of a solid-core copper wire in terms of structure, that is, the connecting part is connected with the aluminum wire, and the functional part is connected with the power consumption device or another terminal.

In the present application, the aluminum wire may be a solid-core aluminum wire or a multi-core aluminum wire.

In the present application, the conductive core of the aluminum wire is made of aluminum or aluminum alloy, and the copper terminal is made of copper or copper alloy.

In the present application, the joint of the copper terminal and the aluminum wire has a welding zone, and an area of the welding zone is at least 1% of that of an overlapping zone between the aluminum wire and the copper terminal. Preferably, the area of the welding zone is at least 10% of that of the overlapping zone between the aluminum wire and the copper terminal.

In the present application, a thickness of the metal spacer layer ranges from 3 μm to 5000 μm. In a preferred embodiment, the thickness of the metal spacer layer ranges from 5 μm to 1000 μm. If the thickness of the metal spacer layer is less than 3 μm, the copper terminal may rub against the aluminum wire during ultrasonic welding, and the metal spacer layer is easily destroyed by the copper terminal and the aluminum wire, in this case, copper is in contact with aluminum, and the metal spacer layer has no separating function. If the thickness of the metal spacer layer is greater than 5000 μm, since conductivity of most materials of the metal spacer layer is not as good as copper and aluminum, an increased thickness of the metal spacer layer may cause an increased voltage drop of the welded joint. In addition, the amount of the metal spacer layer is increased, which may increase the cost, while has no significant increase in performances of the joint. Generally, in a case that the metal spacer layer is fixed in an electroplating manner or an arc spraying manner, the thickness of the metal spacer layer may range from 3 μm to 1000 μm. In a case that the metal spacer layer is fixed in an electromagnetic welding manner or a pressure welding manner, the thickness of the metal spacer layer may range from 1000 μm to 5000 μm. Therefore, the metal spacer layer in the present application has a thickness ranging from 3 μm to 5000 μm.

In the present application, the metal spacer layer is made of a material having an electrode potential between an electrode potential of copper and an electrode potential of aluminum, or equal to the electrode potential of copper or the electrode potential of aluminum. In a preferred embodiment, the metal spacer layer is made of one or a combination of nickel, cadmium, zirconium, chromium, manganese, aluminum, tin, titanium, zinc, cobalt. More preferably, the metal spacer layer is made of one or a combination of aluminum, nickel and zinc.

In addition to that the metal having an electrode potential between the electrode potential of copper and the electrode potential of aluminum (including the case of equaling to the electrode potential of copper or the electrode potential of aluminum) may be used to form the metal spacer layer of the present application, gold or silver or a combination thereof may also be used to form the metal spacer layer, this is because gold and silver have good electrical conductivity and stable chemical performances.

The above described material combination of the metal spacer layer includes a case that the metal spacer layer is made of alloy, and a case that the metal spacer layer is formed in a multi-layer coating manner, and also includes a case that the metal spacer layer is made of a metal composition formed by mixing different metal materials with a physical method or a chemical method.

An ultrasonic welding method for forming a joint of a copper terminal and an aluminum wire is further provided according to the present application. Specifically, the method includes the following steps:

1) fixing, by an electroplating process or an electromagnetic welding process or an arc spraying process or a pressure welding process, the metal spacer layer to a zone of the to-be-welded copper terminal or aluminum wire, wherein the zone at least comprises the welding zone, and preferably, the metal spacer layer is fixed to the zone of the to-be-welded copper terminal or aluminum wire by an electroplating process;

2) joining the copper terminal and the aluminum wire, and fixing the joined copper terminal and aluminum wire to a mold or a tool of an ultrasonic welding device;

3) starting the ultrasonic welding device, and welding the joined copper terminal and aluminum wire by using the vibration energy of the ultrasonic welding device transferred to the ultrasonic mold or tool, where the copper terminal and the aluminum wire are melted due to heat generated by high-speed friction of the copper terminal and the aluminum wire, and the welding process is performed under a pressure.

In the present application, the metal spacer layer may be fixed to the copper terminal or the aluminum wire with a conventional method with which the metal spacer layer may be stably fixed to one of the base material, such as an electroplating method, an electromagnetic welding method, an arc spraying method, and a pressure welding method.

The electroplating method includes the following steps 1 to 4. In step 1, a plating metal is connected to an anode. In step 2, a to-be-plated substrate is connected to a cathode. In step 3, the cathode and anode are both connected with an electrolyte solution including cations of the plating metal. In step 4, a DC power supply is applied, such that the metal at the anode is oxidized (lose electrons), and the cations in the solution is reduced (obtain electrons) at the cathode to form atoms, and the atoms are accumulated on a surface of the to-be-plated substrate.

The electromagnetic welding method includes the following steps 1 and 2. In step 1, two metals to be welded are stacked. In step 2, a high pressure magnetic field is formed in the welding zone by an electromagnetic welding device, such that an impact at an atomic energy level occurs between the two metals under an action of an electromagnetic force, thereby welding the two metals together.

In the arc spraying method, the metal of the metal spacer layer is arranged in an arc zone for being atomized, and the atomized metal is sprayed to a surface of a work piece at a high speed under an action of a compressed gas to form an arc spray coating.

The pressure welding method includes the following steps 1 to 3. In step 1, two metals to be welded are stacked. In step 2, a pressure is applied to make materials at to-be-welded surfaces fully diffused to realize the bonding of atoms. In step 3, depending on the metal and the pressure source, a welding temperature may be increased to improve the welding effect and shorten the time period for welding.

Preferably, the electroplating method is adopted for the following four reasons. First, the electroplating technology is mature and has advantages in processing cost and time cost. Second, the plating formed with the electroplating method is thin, thus the electroplating technology has advantages in dosage and cost of spacer metal. Third, the plated copper terminal or aluminum wire has an improved capability in resisting salt fog corrosion and acid-alkali corrosion, which may prolong the service life of the joint. Four, it has been found from tests that the joint formed with the electroplating method has significant advantages in pull-out force and voltage drop.

In step 1) of the method for forming a joint according to the present application, in a case that an insulation layer is coated on the aluminum wire, it is required to strip the insulation layer at a welded end of the aluminum wire before fixing the aluminum wire.

In the method for forming a joint according to the present application, an ultrasonic frequency of the ultrasonic welding device ranges from 5 KHZ to 40 KHZ. Based on a sectional area of the welding zone, a power of the ultrasonic welding device ranges from 2 kW to 20 kW, and a pressure of a welding head of the ultrasonic welding device ranges from 0.5 KN to 30 KN, and an amplitude of the ultrasonic welding device may be adjusted from 0 to 100%. In a preferred embodiment, the ultrasonic frequency of the ultrasonic welding device ranges from 15 KHZ to 25 KHZ, the power of the ultrasonic welding device ranges from 5 kW to 15 kW, the amplitude of the ultrasonic welding device ranges from 30% to 100%, and the pressure of the welding head of the ultrasonic device ranges from 3 KN to 20 KN.

In the present application, since a solid ultrasonic welding method is used, a problem that the welding temperature is too high and a brittle intermetallic compound is formed can be avoided. In the present application, the metal spacer layer is made of one or a combination of zinc, nickel and aluminum. The metal spacer layer is firstly fixed to a substrate in an electroplating manner, an electromagnetic welding manner, an arc spraying manner or a pressure welding manner, and then the ultrasonic welding method is performed, which aims to prevent electrochemical corrosion between copper and aluminum, and no other solder or flux is needed in the welding process.

In the conventional technology, there is no introduction of adding a metal spacer layer between copper and aluminum in the copper-aluminum ultrasonic welding process. It can be seen from a large number of experiments and tests that, by adding the metal spacer layer, not only the mechanical and electrical performances of the joint of the copper terminal and aluminum wire are ensured, but also the electrochemical corrosion resistance and metal corrosion resistance of the joint of the copper terminal and aluminum wire are greatly improved, thereby significantly improving the service life of the joint.

The following beneficial effects can be achieved according to the present application.

1. In the present application, a metal spacer layer is formed between a connecting part of a copper terminal and an conductive core of an aluminum wire, it can be seen from a large number of experiments and tests that, by adding the metal spacer layer, not only the mechanical and electrical performances of the joint of the copper terminal and aluminum wire are ensured, but also the electrochemical corrosion resistance and metal corrosion resistance of the joint of the copper terminal and aluminum wire are greatly improved.

2. Compared with the ultrasonic brazing method, with the welding method according to the present application, it is unnecessary to heat the material, such that there is no brittle metal generated between copper and aluminum, thus the problem of decrease in welded seam strength and plasticity and even the problem of lattice corrosion can be avoided. In addition, it is unnecessary to use flux, such that no corrosion may be caused to the welded joint.

3. In the conventional method for directly welding different metals using ultrasonic, two metals with a large difference in electrode potentials are directly welded together, since the electrochemical reaction may occur between copper and aluminum, the metal with a lower electrode potential may lose electrons under the action of water and air, and metal corrosion is caused, which reduces the service life of copper-aluminum joint. Compared with the conventional method, in the present application, the conductive core of the aluminum wire is connected with the connecting part of the copper terminal via the metal spacer layer, which can greatly reduce the electrochemical reaction between the metals, thereby reducing the metal corrosion, thus prolonging the service life of the joint by at least 50%.

4. Since the welding are performed between metals, the problem in the patent CN102216021B that mechanical performance is reduced due to the applied sealant is avoided, and the pull-out force of the joint of the copper terminal and aluminum wire can be increased by at least 20% after the salt spray test.

5. Compared with the conventional technology, the joint of a copper terminal and an aluminum wire can be prepared with the ultrasonic welding method according to the present application by using a fully automatic device and fixtures, thereby improving the production efficiency and reducing manpower, thus improving the production stability and significantly reducing the production cost.

6. It is unnecessary to add any solder, flux and protective gas during the welding process, no other processing is required after the welding process is performed, thereby generating no waste and burr, thus reducing the cost and abating pollution.

Figure 1:
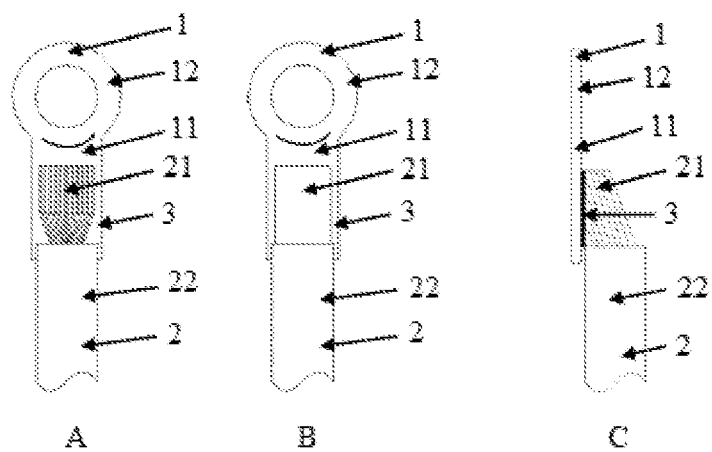
FIG. 1 is a schematic view of a joint of a copper terminal and an aluminum wire according to a first embodiment of the present application.
A: joint between a multi-core aluminum wire and a flat copper terminal;
B: joint of a solid-core aluminum wire and the flat copper terminal; and
C: schematic side view of the joint shown in FIG. 1A.

Reference signs in the drawings are listed as follows:

| | |
|---|---|
| 1 | copper terminal |
| 2 | aluminum wire |
| 3 | metal spacer layer |
| 11 | connecting part |
| 12 | functional part |
| 21 | conductive core |
| 22 | insulation layer |

DETAILED DESCRIPTION OF EMBODIMENTS

The technical solutions of the present application are further illustrated by the specific embodiments hereinafter, the specific embodiments do not intend to limit the protection scope of the present application. Some non-essential modifications and adaptations made by others according to the concept of the present application should fall within the protection scope of the present application.

In the present application, the "welding zone" refers to a zone where the copper terminal and the aluminum wire are welded together via a welding head of an ultrasonic device.

In the present application, for the description "a conductive core of an aluminum wire is connected with a connecting part of a copper terminal via a metal spacer layer", it should be understood that the direct connection or the indirect connection fall within the protection scope of the present application. The direct connection means that the connecting part is connected with the conductive core of the aluminum wire only via the metal spacer layer. The indirect connection means that, in addition to the metal spacer layer, there is another structure of non-metallic material, such as a graphene layer or a structure formed by another material, between the connecting part and the conductive core of the aluminum wire.

First Embodiment Joint of a Copper Terminal and an Aluminum Wire and an Ultrasonic Welding Method Thereof FIG. 1 shows a joint of a copper terminal and an aluminum wire. The copper terminal 1 is a flat copper terminal, and the copper terminal 1 includes a connecting part 11 and a functional part 12. The aluminum wire 2 includes a conductive core 21 and an insulation layer 22, and the aluminum wire is a multicore aluminum wire (FIG. 1A) or a solid-core aluminum wire (FIG. 1B). The conductive core of the aluminum wire 2 is connected with the connecting part 11 of the copper terminal 1, and a metal spacer layer 3 is interposed between the wire core of the aluminum wire and the connecting part of the copper terminal.

The joint is formed with a welding method including the following steps 1 to 3. In step 1), a metal spacer layer (the metal spacer layer is made of nickel in the present embodiment) is electroplated at a welding zone of the copper terminal, where the thickness of the metal spacer layer is 8 μm. In step 2), the copper terminal is arranged in a mold of an ultrasonic welding device, and the aluminum wire is also arranged in the mold and stacked with the copper terminal. In step 3), the ultrasonic welding device is started, in a case that the three metals are compacted by a welding head, the vibration welding process is performed. A frequency of the ultrasonic is 20 KHZ, a power of the ultrasonic welding device is 5 kW, a welding amplitude is 80%, and a pressure of the ultrasonic welding head is 4.5 KN.

Figure 2:
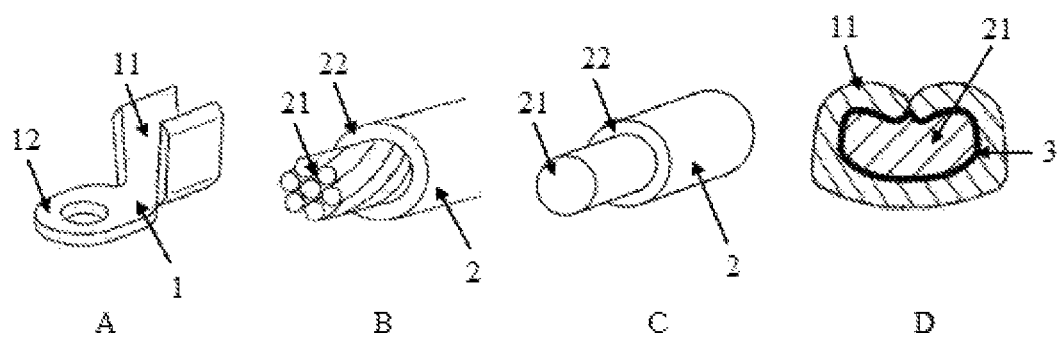
FIG. 2 is a schematic view of a joint of a copper terminal and an aluminum wire according to a second embodiment of the present application.
A: open copper terminal before a welding process is performed;
B: multi-core aluminum wire;
C: solid aluminum wire; and
D: cross-sectional view of a joint formed by a welding process according to the second embodiment.

Second Embodiment Joint of a Copper Terminal and an Aluminum Wire and an Ultrasonic Welding Method Thereof FIG. 2 shows a joint of a copper terminal and an aluminum wire. The copper terminal 1 is an open terminal, and the copper terminal 1 includes a connecting part 11 and a functional part 12. The aluminum wire 2 includes a conductive core 21 and an insulation layer 22, and the aluminum wire is a multicore aluminum wire (FIG. 2B) or a solid-core aluminum wire (FIG. 2C). The conductive core 21 of the aluminum wire 2 is connected with the connecting part 11 of the copper terminal 1, and a metal spacer layer 3 is interposed between the wire core of the aluminum wire and the connecting part of the copper terminal.

The joint is formed with a welding method including the following steps 1 to 4. In step 1), a metal spacer layer (the metal spacer layer is made of zinc in the present embodiment) is electroplated at a welding zone of the copper terminal, where the thickness of the metal spacer layer is 5 μm. In step 2), the copper terminal is arranged in a pressing mold, and the conductive core of the aluminum wire is arranged in an opening of the copper terminal. A pressing machine is started to press the aluminum wire toward the copper terminal, such that a to-be-welding part of the aluminum wire is surrounded by the opening of the copper terminal. In step 3), the joined three metals obtained in step 2) are arranged in an ultrasonic welding mold. In step 4), the ultrasonic welding device is started, in a case that the three metals are compacted by the welding head, the vibration welding process is performed. A frequency of the ultrasonic is 20 KHZ, a power of the ultrasonic welding device is 9 kW, a welding amplitude is 90%, and a pressure of the ultrasonic welding head is 15 KN.

Figure 3:
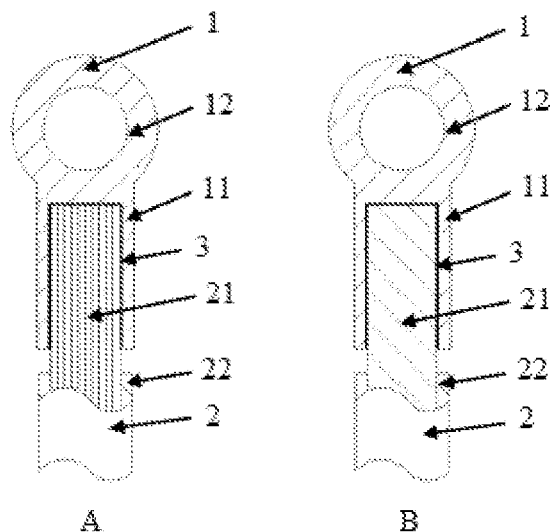
FIG. 3 is a schematic view of a joint of a copper terminal and an aluminum wire according to a third embodiment of the present application.
A: joint of a multi-core aluminum wire and a cylindrical copper terminal; and
B: joint of a solid-core aluminum wire and the cylindrical copper terminal.

Third Embodiment Joint of a Copper Terminal and an Aluminum Wire and an Ultrasonic Welding Method Thereof FIG. 3 shows a joint of a copper terminal and an aluminum wire. The copper terminal 1 is a barrel-shaped terminal, and the copper terminal 1 includes a connecting part 11 and a functional part 12. The aluminum wire 2 includes a conductive core 21 and an insulation layer 22, and the aluminum wire is a multicore aluminum wire (FIG. 3A) or a solid-core aluminum wire (FIG. 3B). The conductive core 21 of the aluminum wire 2 is connected with the connecting part 11 of the copper terminal 1, and a metal spacer layer 3 is interposed between the wire core of the aluminum wire and the connecting part of the copper terminal.

The joint is formed with a welding method including the following steps 1 to 4. In step 1), a metal spacer layer (the metal spacer layer is made of silver in the present embodiment) is electroplated at a welding zone of the copper terminal, where the thickness of the metal spacer layer is 10 μm. In step 2), a welding zone of the conductive core of the aluminum wire is inserted into a cylinder of the copper terminal. In step 3), the three metals after the inserting process in step 2) are arranged in a mold of an ultrasonic welding device. In step 4), the ultrasonic welding device is started, in a case that the three metals are compacted by the welding head, the vibration welding process is performed. A frequency of the ultrasonic is 25 KHZ, a power of the ultrasonic welding device is 7.5 kW, a welding amplitude is 100%, and a pressure of the ultrasonic welding head is 10 KN.

Figure 4:
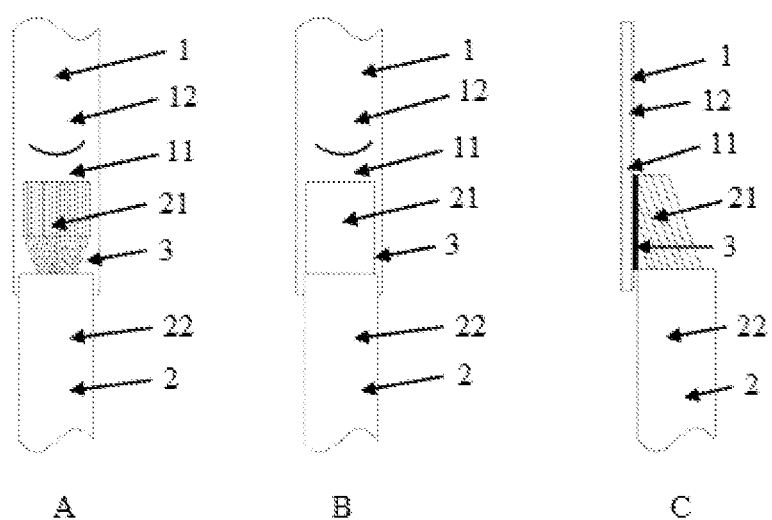
FIG. 4 is a schematic view of a joint of a copper terminal and an aluminum wire according to a fourth embodiment of the present application.
A: joint of a multi-core aluminum wire and a flat copper wire;
B: joint of a solid-core aluminum wire and the flat copper wire; and
C: schematic side view of the joint shown in FIG. 3A.

Fourth Embodiment Joint of a Solid-Core Copper Wire and an Aluminum Wire and an Ultrasonic Welding Method Thereof FIG. 4 shows a joint of a copper terminal and an aluminum wire. The copper terminal 1 is a solid-core copper wire, and the solid copper wire 1 includes a connecting part 11 and a functional part 12. The aluminum wire 2 includes a conductive core 21 and an insulation layer 22, and the aluminum wire is a multicore aluminum wire (FIG. 4A) or a solid-core aluminum wire (FIG. 4B). The conductive core 21 of the aluminum wire 2 is connected with the solid copper wire 11, and a metal spacer layer 3 is interposed between the wire core of the aluminum wire and the connecting part of the solid copper wire.

In a case that the copper terminal is a flat solid wire, and the aluminum wire is a solid-core aluminum wire or a multicore aluminum wire, the joint is formed with a welding method including the following steps 1 to 3. In step 1), a metal spacer layer (the metal spacer layer is made of aluminum in the present embodiment) is electroplated at a welding zone of the copper terminal, where the thickness of the metal spacer layer is 6 μm. In step 2), the copper terminal is arranged in a mold of an ultrasonic welding device, and the aluminum wire is also arranged in the mold of the ultrasonic welding device and stacked with the solid copper wire. In step 3), the ultrasonic welding device is started, in a case that the three metals are compacted by a welding head, the vibration welding process is performed. A frequency of the ultrasonic is 15 KHZ, a welding amplitude is 80%, a power of the ultrasonic welding device is 12 kW, and a pressure of the ultrasonic welding head is 20 KN.

Fifth Embodiment Effects of Different Spacer Layers on Performances of the Welded Joint Fifty pairs of copper terminals and aluminum wires are taken as an example. In this example, the copper terminals are made of the same material and have the same structure, and the aluminum wires are made of the same material and have the same structure, the same ultrasonic welding device and tooling are used with the same welding parameters, plating thickness (8 μm) and welding method as that in the first embodiment. Among the fifty pairs of copper terminals and aluminum wires, ten pairs of copper terminals and aluminum wires are processed without any metal spacer layer, another 10 pairs of copper terminals and aluminum wires are processed with a metal spacer layer made of nickel (Ni), another 10 pairs of copper terminals and aluminum wires are processed with a metal spacer layer made of zinc (Zn), another 10 pairs of copper terminals and aluminum wires are processed with a metal spacer layer which includes a nickel (Ni) plated bottom and a zinc (Zn) plated surface, and the remaining 10 pairs of copper terminals and aluminum wires are processed with an anti-corrosion conductive sealant as a metal spacer layer. After the welding process is performed, the mechanical and electrical performances of each welded joint are tested before and after corrosion, and then a comparison is performed.

TABLE 1

Effects of different spacer layers on the pull-out force (N)

| | Spacer layer | | | | | | | | | |
|---|---|---|---|---|---|---|---|---|---|---|
| Number | None | Sealant | Ni | Zn | Ni plated bottom and Zn plated surface | None | Sealant | Ni | Zn | Ni plated bottom and Zn plated surface |
| | Before salt spray corrosion | | | | | Salt spray corrosion for 24 hours | | | | |
| 1 | 1803 | 1654 | 1892 | 1827 | 1905 | 1455 | 1433 | 1820 | 1756 | 1895 |
| 2 | 1812 | 1680 | 1884 | 1821 | 1901 | 1472 | 1462 | 1834 | 1762 | 1887 |
| 3 | 1806 | 1677 | 1908 | 1834 | 1892 | 1462 | 1472 | 1856 | 1749 | 1878 |
| 4 | 1811 | 1656 | 1911 | 1826 | 1874 | 1457 | 1465 | 1843 | 1758 | 1861 |

TABLE 1-continued

Effects of different spacer layers on the pull-out force (N)

| | Spacer layer | | | | | | | | |
|---|---|---|---|---|---|---|---|---|---|
| | None | Sealant | Ni | Zn | Ni plated bottom and Zn plated surface | None | Sealant | Ni | Zn | Ni plated bottom and Zn plated surface |
| Number | Before salt spray corrosion | | | | | Salt spray corrosion for 24 hours | | | | |
| 5 | 1817 | 1664 | 1886 | 1827 | 1895 | 1452 | 1458 | 1835 | 1755 | 1877 |
| 6 | 1801 | 1628 | 1879 | 1819 | 1907 | 1468 | 1475 | 1849 | 1746 | 1893 |
| 7 | 1816 | 1692 | 1894 | 1825 | 1865 | 1468 | 1464 | 1835 | 1752 | 1837 |
| 8 | 1817 | 1672 | 1892 | 1832 | 1893 | 1457 | 1453 | 1837 | 1764 | 1857 |
| 9 | 1824 | 1684 | 1877 | 1828 | 1887 | 1465 | 1471 | 1834 | 1753 | 1866 |
| 10 | 1809 | 1683 | 1908 | 1818 | 1906 | 1477 | 1468 | 1848 | 1758 | 1892 |
| Average | 1812 | 1669 | 1893 | 1826 | 1893 | 1463 | 1462 | 1839 | 1755 | 1874 |

TABLE 2

Effects of different spacer layers on the voltage drop (mV)

| | Spacer layer | | | | | | | | |
|---|---|---|---|---|---|---|---|---|---|
| | None | Sealant | Ni | Zn | Ni plated bottom and Zn plated surface | None | Sealant | Ni | Zn | Ni plated bottom and Zn plated surface |
| Number | Before salt spray corrosion | | | | | Salt spray corrosion for 24 hours | | | | |
| 1 | 3.2 | 4.6 | 3.7 | 3.5 | 3.4 | 7 | 7.2 | 4.5 | 3.9 | 4.2 |
| 2 | 3.5 | 4.3 | 3.6 | 3.2 | 3.5 | 6.9 | 7.4 | 4.4 | 4.1 | 4.1 |
| 3 | 3.1 | 4.7 | 3.8 | 3.4 | 3.5 | 7.2 | 7.5 | 4.7 | 3.8 | 4.3 |
| 4 | 3.4 | 4.5 | 3.7 | 3.5 | 3.6 | 7.1 | 7.4 | 4.6 | 3.8 | 4.2 |
| 5 | 3.2 | 4.7 | 3.9 | 3.6 | 3.5 | 7.3 | 7.5 | 4.7 | 3.9 | 4.2 |
| 6 | 3.2 | 4.3 | 3.7 | 3.5 | 3.6 | 6.8 | 7.4 | 4.5 | 3.8 | 4.3 |
| 7 | 3.5 | 4.5 | 3.6 | 3.6 | 3.4 | 7.2 | 7.6 | 4.7 | 3.7 | 4.2 |
| 8 | 3.4 | 4.7 | 3.8 | 3.4 | 3.4 | 7.1 | 7.5 | 4.6 | 4.2 | 4.4 |
| 9 | 3.5 | 4.5 | 3.7 | 3.2 | 3.6 | 7 | 7.3 | 4.6 | 4 | 4.3 |
| 10 | 3.1 | 4.8 | 3.5 | 3.4 | 3.3 | 6.9 | 7.5 | 4.5 | 4.1 | 4.2 |
| Average | 3.31 | 4.56 | 3.7 | 3.43 | 3.48 | 7.05 | 7.43 | 4.58 | 3.93 | 4.24 |

It can be seen from Tables 1 and 2 that, the performances in the pull-out force and the voltage drop for the structures with a Ni plating layer or a Zn plating layer or a composite plating layer are better than those for the structures with the sealant. Moreover, after the salt spray test of 24 hours, the reduction of the performances in the pull-out force and the voltage drop for the structures with the Ni plating layer or the Zn plating layer or the composite plating layer are much less than those for the structures with the sealant.

Also it can be seen from Tables 1 and 2 that, although the performances in the pull-out force and the voltage drop for the welded structure without a plating layer are close to those for the structures with the Ni plating layer or the Zn plating layer or the composite plating layer at an initial stage of the welding process, after the salt spray test is performed, since electrochemical corrosion and metal corrosion both occur between copper and aluminum under the action of air, water and salt spray, the performances in the pull-out force and the voltage drop are greatly reduced, failing to ensure the electrical and mechanical performances of the joint of the copper terminal and the aluminum wire.

Sixth Embodiment Effects of Different Metal Spacer Layer Fixing Manners on the Performance of the Welded Joint Forty pairs of copper terminals and aluminum wires are taken as an example. In this example, the copper terminals are made of the same material and have the same structure, and the aluminum wires are made of the same material and have the same structure, the same ultrasonic welding device and tooling are used, and the metal spacer layers are made of Zn and have the same thickness. Among the forty pairs of copper terminals and aluminum wires, for ten pairs of copper terminals and aluminum wires, the spacer metal Zn is fixed to the copper terminal with a pressure welding method; for another ten pairs of copper terminals and aluminum wires, the spacer metal is fixed to the copper terminal with an electromagnetic welding method; for another ten pairs of copper terminals and aluminum wires, the spacer metal Zn is fixed to the copper terminal with an electroplating method; and for the remaining ten pairs of copper terminals and aluminum wires, the spacer metal Zn is fixed to the copper terminal with an arc spraying method. The copper terminal and the aluminum wire are welded together, and after the welding process is performed, the mechanical and electrical performances of the joint of the copper terminal and the aluminum wire are detected before and after corrosion, and then a comparison is performed.

The detection results for the salt spray corrosion, voltage drop and pull-out force are shown in Tables 3 and 4.

TABLE 3

Effects of metal spacer layers fixed with different fixing manners on the pull-out force (N)

| | Fixing manner | | | | | | | |
|---|---|---|---|---|---|---|---|---|
| Number | Pressure welding | Electromagnetic welding | Electroplating | Arc spraying | Pressure welding | Electromagnetic welding | Electroplating | Arc spraying |
| | Before salt spray corrosion | | | | Salt spray corrosion for 24 hours | | | |
| 1 | 1856 | 1872 | 1925 | 1902 | 1639 | 1654 | 1835 | 1827 |
| 2 | 1837 | 1853 | 1901 | 1896 | 1643 | 1649 | 1826 | 1831 |
| 3 | 1848 | 1864 | 1934 | 1894 | 1640 | 1659 | 1832 | 1824 |
| 4 | 1840 | 1867 | 1921 | 1907 | 1649 | 1662 | 1838 | 1830 |
| 5 | 1852 | 1858 | 1928 | 1911 | 1658 | 1660 | 1827 | 1826 |
| 6 | 1859 | 1869 | 1933 | 1895 | 1666 | 1658 | 1846 | 1817 |
| 7 | 1849 | 1863 | 1927 | 1890 | 1649 | 1665 | 1837 | 1824 |
| 8 | 1846 | 1874 | 1936 | 1906 | 1643 | 1657 | 1836 | 1825 |
| 9 | 1857 | 1854 | 1916 | 1897 | 1648 | 1664 | 1841 | 1813 |
| 10 | 1844 | 1866 | 1911 | 1912 | 1637 | 1663 | 1843 | 1828 |
| Average | 1849 | 1864 | 1923 | 1901 | 1647 | 1659 | 1836 | 1824 |

TABLE 4

Effects of metal spacer layers fixed with different fixing manners on the voltage drop (mV)

| | Fixing manner | | | | | | | |
|---|---|---|---|---|---|---|---|---|
| Number | Pressure welding | Electromagnetic welding | Electroplating | Arc spraying | Pressure welding | Electromagnetic welding | Electroplating | Arc spraying |
| | Before salt spray corrosion | | | | Salt spray corrosion for 24 hours | | | |
| 1 | 3.8 | 3.5 | 3.2 | 3.4 | 4.8 | 4.6 | 3.9 | 4.0 |
| 2 | 3.7 | 3.3 | 3.4 | 3.3 | 4.7 | 4.7 | 3.7 | 4.1 |
| 3 | 3.7 | 3.4 | 3.4 | 3.3 | 4.7 | 4.8 | 3.8 | 3.9 |
| 4 | 3.8 | 3.4 | 3.3 | 3.4 | 4.8 | 4.7 | 3.7 | 3.8 |
| 5 | 3.6 | 3.3 | 3.2 | 3.5 | 4.9 | 4.7 | 3.9 | 3.9 |
| 6 | 3.7 | 3.5 | 3.3 | 3.4 | 4.8 | 4.8 | 4.0 | 3.9 |
| 7 | 3.6 | 3.4 | 3.4 | 3.6 | 4.7 | 4.7 | 3.8 | 4.1 |
| 8 | 3.8 | 3.5 | 3.2 | 3.4 | 4.9 | 4.8 | 3.9 | 3.9 |
| 9 | 3.8 | 3.6 | 3.1 | 3.5 | 4.9 | 4.6 | 3.8 | 3.8 |
| 10 | 3.7 | 3.5 | 3.4 | 3.5 | 4.8 | 4.6 | 3.8 | 3.9 |
| Average | 3.72 | 3.44 | 3.29 | 3.43 | 4.8 | 4.7 | 3.83 | 3.93 |

It can be seen from Table 3 and Table 4 that, for the different welding methods, the joint formed by the electroplating method have good mechanical and electrical performances, the joint formed by the electromagnetic welding method and the arc spraying method have the medium mechanical and electrical performances, and the joint formed by the pressure welding method have poor mechanical and electrical performances. In a case that the metal spacer layers in the four cases have the same thickness, the joint of a copper terminal and an aluminum wire, which is formed with the electroplating method, has a good performance. Moreover, the electroplating technology is mature and has advantages in processing cost and time cost.

Seventh Embodiment Effects of Welding Zones with Different Areas on the Performance of the Welded Joint One hundred and twenty pairs of copper terminals and aluminum wires are taken as an example. In this example, the copper terminals are made of the same material and have the same structure, and the aluminum wires are made of the same material and have the same structure, the pairs of copper terminals and aluminum wires are divided into 12 groups, and each group includes 10 pairs of copper terminals and aluminum wires, and the same ultrasonic welding device and tooling are used, and the metal spacer layers are made of Zn and have the same thickness. For the overlapping zones between the aluminum wires and the copper terminals having the same area, welding zones with different areas are formed. The welding zones with different areas have different proportions relative to the overlapping zone between the aluminum wire and the copper terminal, and effects of the welding zones with different areas on the electrical and mechanical performances of the joint formed with the ultrasonic welding method are detected, and then a comparison is performed.

It can be seen from data in the following Table 5 that, in a case that the welding zone has large proportion relative to the overlapping zone between the aluminum wire and the copper terminal, the welded joint thus formed has good performances in the voltage drop and the pull-out force. In a case that the proportion is less than 1%, the electrical and mechanical performances of the joint are significantly decreased. Therefore, the area of the welding zone of the joint is at least 1% of that of the overlapping zone between the aluminum wire and the copper terminal. Preferably, the area of the welding zone of the joint is at least 10% of that of the overlapping zone between the aluminum wire and the copper terminal.

TABLE 5

Effects of welding zones with different areas on
the voltage drop (mV) and the pull-out force (N)

| Number | Area proportion | Voltage drop (mV) | pull-out force (N) |
|---|---|---|---|
| 1 | 100% | 3.1 | 2158.4 |
| 2 | 90% | 3.1 | 2013.5 |
| 3 | 80% | 3.2 | 1976.9 |
| 4 | 70% | 3.2 | 1952.6 |
| 5 | 60% | 3.4 | 1916.7 |
| 6 | 50% | 3.4 | 1904.9 |
| 7 | 40% | 3.5 | 1894.2 |
| 8 | 30% | 3.6 | 1861.8 |
| 9 | 20% | 3.6 | 1849.2 |
| 10 | 10% | 3.7 | 1827.5 |
| 11 | 1% | 3.8 | 1817.4 |
| 12 | <1% | 4.2 | 1628.9 |

Eighth Embodiment Effects of Metal Spacer Layers with Different Thicknesses on the Performances of the Welded Joint One hundred and fifty pairs of copper terminals and aluminum wires are taken as an example. In this example, the copper terminals and aluminum wires are the same in structure and material as that in the third embodiment, the pairs of copper terminals and aluminum wires are divided into 15 groups, and each group includes 10 pairs of copper terminals and aluminum wires, the copper terminals are respectively plated with zinc with the electroplating method to form metal spacer layers of different thickness ranging from 1 μm to 1000 μm, and the metal spacer layers made of zinc of different thickness ranging from 1000 μm to 6000 μm are respectively fixed to the copper terminals with the pressure welding method. The aluminum wires are welded with respective copper terminals with the same ultrasonic welding device and tooling, and the pull-out force and the voltage drop are tested for each welded copper-aluminum joint after the welding process is performed.

It can be seen from the data in the following Tables 6 and 7 that, in a case that the thickness of the metal spacer layer is more than 5000 μm or less than 3 μm, the mechanical and electrical performances of the joint of the copper terminal and the aluminum wire are significantly decreased. Therefore, the thickness of the metal spacer layer ranges from 3 μm to 5000 μm. Preferably, in a case that the thickness of the metal spacer layer ranges from 5 μm to 1000 μm, the joint of the copper terminal and the aluminum wire has good mechanical and electrical performances.

TABLE 6

Effects of metal spacer layers with different thickness on the pull-out force (N)

| | Thickness of the metal spacer layer | | | | | | | |
|---|---|---|---|---|---|---|---|---|
| | 1 μm | 3 μm | 5 μm | 10 μm | 50 μm | 100 μm | 300 μm | 500 μm |
| Number | The pull-out force (N) after welding | | | | | | | |
| 1 | 1533 | 1772 | 1832 | 1952 | 1916 | 1901 | 1867 | 1813 |
| 2 | 1528 | 1756 | 1848 | 1968 | 1921 | 1894 | 1858 | 1817 |
| 3 | 1552 | 1784 | 1831 | 1948 | 1924 | 1876 | 1866 | 1825 |
| 4 | 1542 | 1763 | 1836 | 1943 | 1917 | 1911 | 1859 | 1829 |
| 5 | 1534 | 1759 | 1821 | 1968 | 1915 | 1885 | 1854 | 1830 |
| 6 | 1529 | 1762 | 1842 | 1964 | 1928 | 1898 | 1853 | 1817 |
| 7 | 1538 | 1758 | 1835 | 1968 | 1934 | 1879 | 1862 | 1814 |
| 8 | 1543 | 1766 | 1844 | 1971 | 1927 | 1876 | 1865 | 1824 |
| 9 | 1537 | 1754 | 1836 | 1980 | 1923 | 1905 | 1858 | 1820 |
| 10 | 1549 | 1752 | 1846 | 1974 | 1927 | 1895 | 1854 | 1828 |
| Average | 1538.5 | 1762.6 | 1837.1 | 1963.6 | 1923.2 | 1892 | 1859.6 | 1821.7 |

| | Thickness of the metal spacer layer | | | | | | |
|---|---|---|---|---|---|---|---|
| | 800 μm | 1000 μm | 2000 μm | 3000 μm | 4000 μm | 5000 μm | 6000 μm |
| Number | The pull-out force (N) after welding | | | | | | |
| 1 | 1802 | 1784 | 1746 | 1728 | 1703 | 1675 | 1489 |
| 2 | 1798 | 1772 | 1751 | 1722 | 1694 | 1684 | 1495 |
| 3 | 1786 | 1756 | 1743 | 1731 | 1708 | 1672 | 1482 |
| 4 | 1792 | 1768 | 1739 | 1725 | 1714 | 1664 | 1496 |
| 5 | 1784 | 1761 | 1755 | 1728 | 1704 | 1681 | 1502 |
| 6 | 1782 | 1782 | 1747 | 1734 | 1709 | 1672 | 1487 |
| 7 | 1790 | 1762 | 1752 | 1729 | 1712 | 1669 | 1479 |
| 8 | 1804 | 1759 | 1747 | 1727 | 1705 | 1666 | 1512 |
| 9 | 1808 | 1785 | 1738 | 1719 | 1699 | 1681 | 1483 |
| 10 | 1794 | 1759 | 1747 | 1734 | 1710 | 1662 | 1487 |
| Average | 1794 | 1768.8 | 1746.5 | 1727.7 | 1705.8 | 1672.6 | 1491.2 |

TABLE 7

Effects of metal spacer layers with different thicknesses on the voltage drop (mV)

| Number | Thickness of the metal spacer layer | | | | | | | | | | | | | | |
|---|---|---|---|---|---|---|---|---|---|---|---|---|---|---|---|
| | 1 μm | 3 μm | 5 μm | 10 μm | 50 μm | 100 μm | 300 μm | 500 μm | 800 μm | 1000 μm | 2000 μm | 3000 μm | 4000 μm | 5000 μm | 6000 μm |
| | The voltage drop (mV) after welding | | | | | | | | | | | | | | |
| 1 | 4.1 | 3.4 | 3.2 | 3.1 | 3.2 | 3.4 | 3.5 | 3.6 | 3.7 | 3.9 | 3.9 | 4.1 | 4.2 | 4.2 | 4.7 |
| 2 | 4.0 | 3.5 | 3.3 | 3.2 | 3.3 | 3.5 | 3.6 | 3.5 | 3.6 | 3.9 | 4.0 | 4.1 | 4.1 | 4.3 | 4.8 |
| 3 | 4.2 | 3.4 | 3.2 | 3.1 | 3.2 | 3.4 | 3.5 | 3.7 | 3.5 | 4.0 | 4.0 | 4.0 | 4.2 | 4.3 | 4.5 |
| 4 | 4.1 | 3.4 | 3.2 | 3.1 | 3.1 | 3.4 | 3.6 | 3.6 | 3.7 | 3.8 | 4.0 | 4.1 | 4.2 | 4.2 | 4.7 |
| 5 | 4.2 | 3.4 | 3.3 | 3.2 | 3.2 | 3.5 | 3.5 | 3.7 | 3.7 | 4.0 | 3.9 | 4.2 | 4.3 | 4.3 | 4.5 |
| 6 | 4.0 | 3.4 | 3.2 | 3.1 | 3.3 | 3.4 | 3.5 | 3.6 | 3.8 | 3.9 | 4.0 | 4.2 | 4.2 | 4.4 | 4.4 |
| 7 | 4.2 | 3.3 | 3.3 | 3.1 | 3.2 | 3.5 | 3.4 | 3.6 | 3.8 | 3.9 | 3.9 | 4.0 | 4.2 | 4.3 | 4.5 |
| 8 | 4.1 | 3.4 | 3.2 | 3.1 | 3.3 | 3.4 | 3.5 | 3.7 | 3.7 | 3.8 | 3.9 | 4.1 | 4.2 | 4.2 | 4.5 |
| 9 | 4.2 | 3.4 | 3.2 | 3.2 | 3.3 | 3.3 | 3.5 | 3.6 | 3.8 | 4.0 | 4.0 | 4.2 | 4.1 | 4.3 | 4.4 |
| 10 | 4.2 | 3.4 | 3.2 | 3.1 | 3.3 | 3.5 | 3.6 | 3.6 | 3.8 | 3.9 | 4.1 | 4.1 | 4.2 | 4.3 | 4.4 |
| Average | 4.13 | 3.4 | 3.23 | 3.13 | 3.24 | 3.43 | 3.52 | 3.62 | 3.71 | 3.91 | 3.97 | 4.11 | 4.19 | 4.28 | 4.65 |

The invention claimed is:

1. A joint of a copper terminal and an aluminum wire, wherein the copper terminal comprises a connecting part and a functional part connected with the connecting part, a conductive core of the aluminum wire is connected with the connecting part of the copper terminal, and wherein the conductive core of the aluminum wire is connected with the connecting part of the copper terminal via a metal spacer layer, wherein the joint of the copper terminal and the aluminum wire has a welding zone, and an area of the welding zone of the joint is at least 1% of that of an overlapping zone between the aluminum wire and the copper terminal, wherein a thickness of the metal spacer layer ranges from 3 μm to 5000 μm.

2. The joint of a copper terminal and an aluminum wire according to claim 1, wherein the copper terminal is a flat terminal, an open terminal, a barrel-shaped terminal, or an end of a solid-core copper wire, and preferably, the aluminum wire is a solid-core aluminum wire or a multi-core aluminum wire.

3. The joint of a copper terminal and an aluminum wire according to claim 1, wherein the conductive core of the aluminum wire is made of aluminum or aluminum alloy, and the copper terminal is made of copper or copper alloy.

4. The joint of a copper terminal and an aluminum wire according to claim 1, wherein the area of the welding zone of the joint is at least 10% of that of the overlapping zone between the aluminum wire and the copper terminal.

5. The joint of a copper terminal and an aluminum wire according to claim 1, wherein the thickness of the metal spacer layer ranges from 5 μm to 1000 μm.

6. The joint of a copper terminal and an aluminum wire according to claim 1, wherein the metal spacer layer is made of a material having an electrode potential between an electrode potential of copper and an electrode potential of aluminum, or equal to the electrode potential of copper or the electrode potential of aluminum;
preferably, the metal spacer layer is made of one or a combination of nickel, cadmium, zirconium, chromium, manganese, aluminum, tin, titanium, zinc, cobalt;
more preferably, the metal spacer layer is made of one or a combination of aluminum, nickel and zinc.

7. The joint of a copper terminal and an aluminum wire according to claim 1, wherein the metal spacer layer is made of gold or silver or a combination thereof.

8. An ultrasonic welding method for forming a joint of a copper terminal and an aluminum wire, wherein the ultrasonic welding method comprises the following steps of:
1) fixing, by an electroplating process or an electromagnetic welding process or an arc spraying process or a pressure welding process, a metal spacer layer to a zone of the to-be-welded copper terminal or aluminum wire, wherein the zone at least comprises a welding zone, and preferably, the metal spacer layer is fixed to the zone of the to-be-welded copper terminal or aluminum wire by an electroplating process, wherein an area of the welding zone of the joint is at least 1% of that of an overlapping zone between the aluminum wire and the copper terminal, and a thickness of the metal spacer layer ranges from 3 μm to 5000 μm;
2) joining the copper terminal and the aluminum wire and fixing the joined copper terminal and aluminum wire to a mold or a tool of an ultrasonic welding device;
3) starting the ultrasonic welding device, and welding the joined copper terminal and aluminum wire by using the vibration energy of the ultrasonic welding device transferred to the ultrasonic mold or tool, wherein the copper terminal and the aluminum wire are melted due to heat generated by high-speed friction between the copper terminal and the aluminum wire, and the welding process is performed under a pressure.

9. The method according to claim 8, wherein a welding amplitude of the ultrasonic welding device ranges from 0 to 100%, and a pressure applied by a welding head of the ultrasonic welding device ranges from 0.5 KN to 30 KN;
preferably, the welding amplitude of the ultrasonic welding device ranges from 30% to 100%; and the pressure applied by the welding head of the ultrasonic welding device ranges from 3 KN to 20 KN.

10. The method according to claim 8, wherein a frequency of the ultrasonic welding device ranges from 5 KHZ to 40 KHZ, and a power of the ultrasonic welding device ranges from 2 kW to 20 kW;
preferably, the frequency of the ultrasonic welding device ranges from 15 KHZ to 25 KHZ, and the power of the ultrasonic welding device ranges from 5 KW to 15 KW.

11. The method according to claim 8, wherein the copper terminal is a flat terminal, an open terminal, a barrel-shaped terminal, or an end of a solid-core copper wire, and preferably, the aluminum wire is a solid-core aluminum wire or a multi-core aluminum wire.

12. The method according to claim 8, wherein the conductive core of the aluminum wire is made of aluminum or aluminum alloy, and the copper terminal is made of copper or copper alloy.

13. The method according to claim 8, wherein the area of the welding zone of the joint is at least 10% of that of the overlapping zone between the aluminum wire and the copper terminal.

14. The method according to claim 8, wherein the thickness of the metal spacer layer ranges from 5 μm to 1000 μm.

15. The method according to claim 8, wherein the metal spacer layer is made of a material having an electrode potential between an electrode potential of copper and an electrode potential of aluminum, or equal to the electrode potential of copper or the electrode potential of aluminum;
   preferably, the metal spacer layer is made of one or a combination of nickel, cadmium, zirconium, chromium, manganese, aluminum, tin, titanium, zinc, cobalt;
   more preferably, the metal spacer layer is made of one or a combination of aluminum, nickel and zinc.

16. The method according to claim 8, wherein the metal spacer layer is made of gold or silver or a combination thereof.

* * * * *